United States Patent
Chun

(10) Patent No.: US 10,915,074 B2
(45) Date of Patent: Feb. 9, 2021

(54) DISPLAY DEVICE

(71) Applicant: LG ELECTRONICS INC., Seoul (KR)

(72) Inventor: Youngho Chun, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 15/710,728

(22) Filed: Sep. 20, 2017

(65) Prior Publication Data
US 2019/0004483 A1    Jan. 3, 2019

(30) Foreign Application Priority Data
Jul. 3, 2017 (KR) .................. 10-2017-0084371

(51) Int. Cl.
*G09G 5/00* (2006.01)
*G05B 13/02* (2006.01)
*H01B 9/00* (2006.01)
H01B 7/08 (2006.01)

(52) U.S. Cl.
CPC ........... *G05B 13/024* (2013.01); *G09G 5/003* (2013.01); *H01B 9/003* (2013.01); *H01B 9/006* (2013.01); *G09G 5/00* (2013.01); *G09G 2300/04* (2013.01); *G09G 2330/021* (2013.01); *G09G 2330/12* (2013.01); *H01B 7/0823* (2013.01)

(58) Field of Classification Search
CPC ........... H01B 9/003; H01B 9/00–0694; H01B 7/0823; H01B 11/00–22; H01B 7/00–428; H01R 25/00–168; H04N 5/44504; H02H 3/32; H02H 3/325; H02J 1/06; G09G 5/00–42; G09G 2300/00–0895; G09G 2330/00–12; G01B 7/02; G01B 21/02; G05B 13/024

USPC ............... 710/313; 363/78; 323/206; 345/211–213; 324/716
See application file for complete search history.

(56) References Cited

U.S. PATENT DOCUMENTS

| | | | | |
|---|---|---|---|---|
| 6,125,048 A | * | 9/2000 | Loughran | H02J 1/06 323/206 |
| 2002/0113907 A1 | * | 8/2002 | Endo | G09G 5/006 348/730 |
| 2004/0257835 A1 | | 12/2004 | Lanni | |

(Continued)

FOREIGN PATENT DOCUMENTS

| | | |
|---|---|---|
| JP | H10143094 | 5/1998 |
| JP | 2002041188 | 2/2002 |
| KR | 1020110035513 | 4/2011 |

OTHER PUBLICATIONS

PCT International Application No. PCT/KR2017/014690, International Search Report dated Mar. 23, 2018, 3 pages.

*Primary Examiner* — Amr A Awad
*Assistant Examiner* — Aaron Midkiff
(74) *Attorney, Agent, or Firm* — Lee, Hong, Degerman, Kang & Waimey PC

(57) ABSTRACT

A display device is disclosed. The display device of present invention comprises a display unit providing an image; a control unit placed spaced apart from the display unit, the control unit providing the display unit with a electric power and a signal; a cable electrically connect the display unit and the control unit, the cable carrying the electric power and the signal; and a controller configured to control a property of the electric power in accordance with a length of the cable.

12 Claims, 17 Drawing Sheets

(56) References Cited

U.S. PATENT DOCUMENTS

| | | | |
|---|---|---|---|
| 2006/0181283 A1* | 8/2006 | Wajcer | G01R 31/11 324/539 |
| 2008/0078568 A1* | 4/2008 | Lin | H01B 7/0823 174/115 |
| 2009/0060425 A1* | 3/2009 | Aronson | G02B 6/4292 385/88 |
| 2010/0267276 A1* | 10/2010 | Wu | H01R 25/003 439/502 |
| 2012/0065794 A1* | 3/2012 | Yokota | B60R 16/023 700/293 |
| 2012/0146618 A1 | 6/2012 | Zelhofer et al. | |
| 2013/0019113 A1* | 1/2013 | Yamaya | G06F 1/266 713/300 |
| 2013/0183852 A1* | 7/2013 | Rostami | H02J 7/0042 439/502 |
| 2016/0249007 A1* | 8/2016 | Felton | H04N 5/45 |

\* cited by examiner

FIG. 8
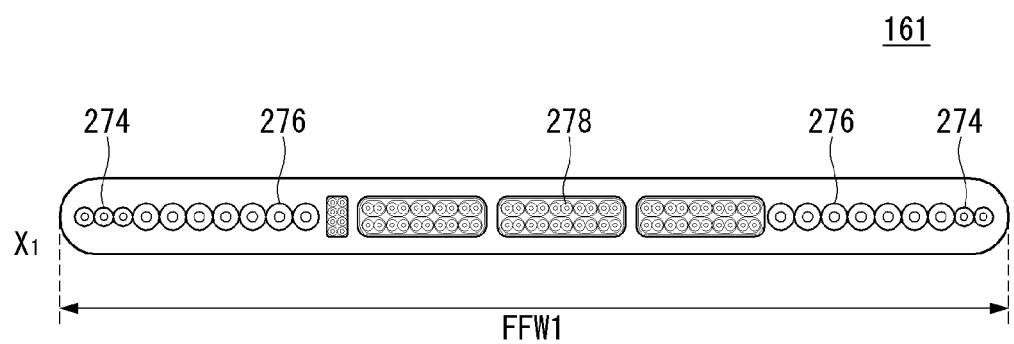
(a)
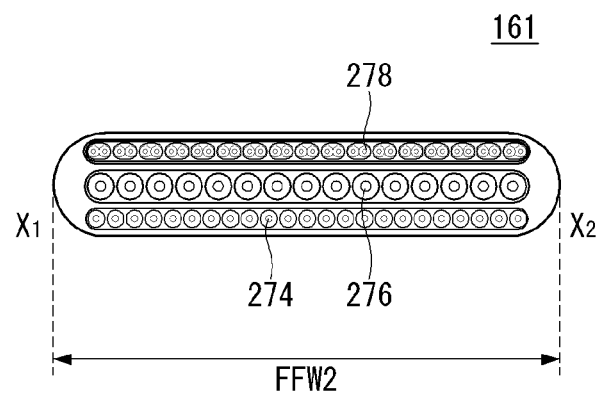
(b)

FIG. 9
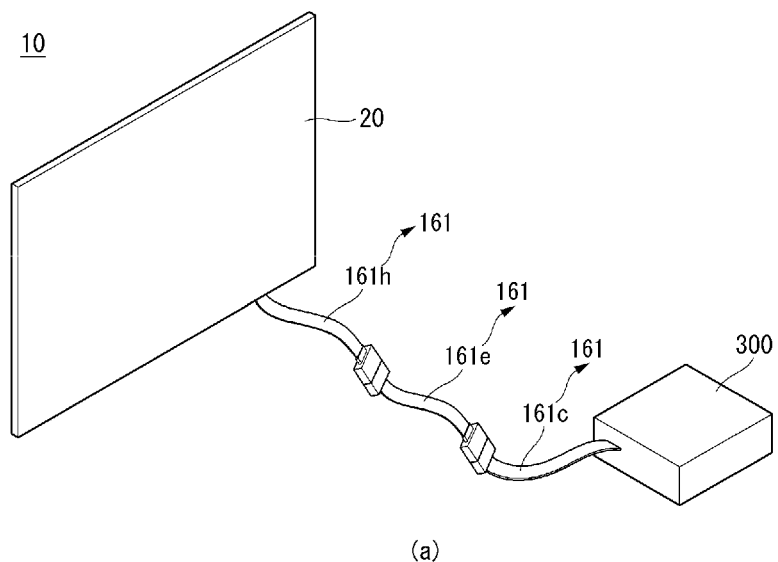
(a)
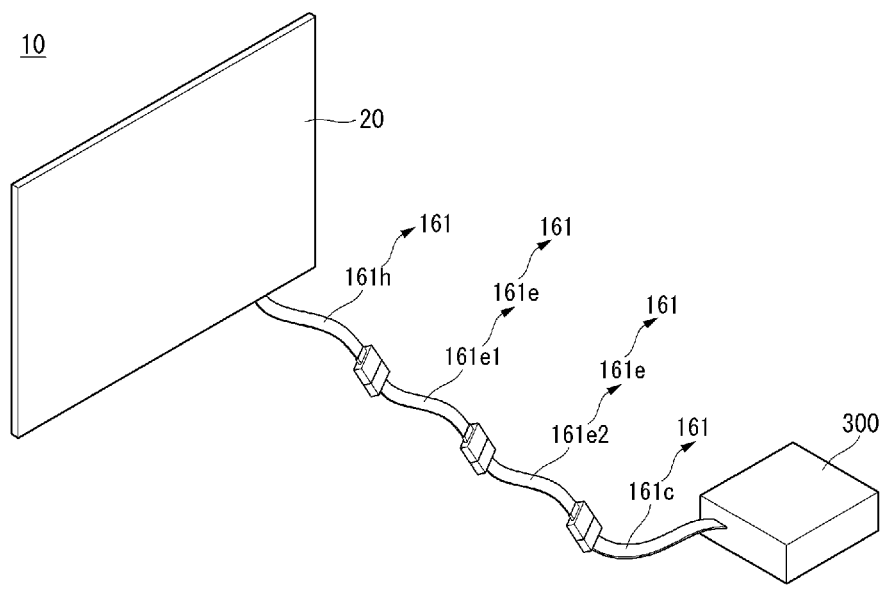
(b)

FIG. 17
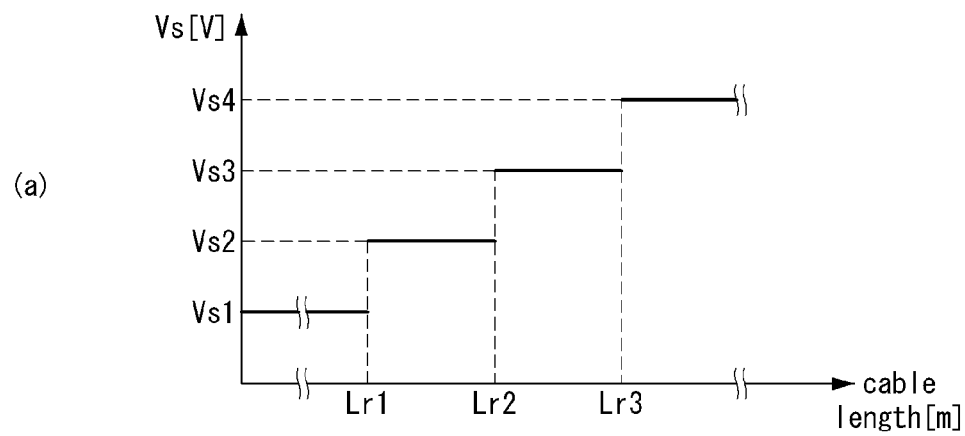
(a)
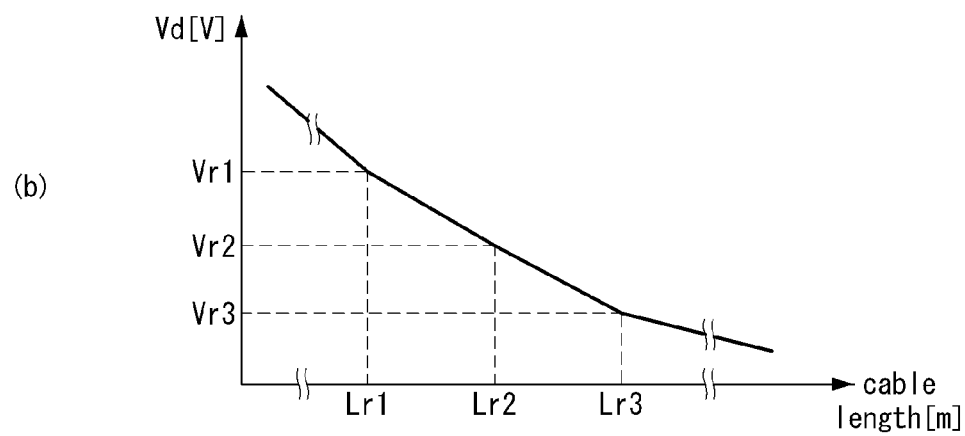
(b)
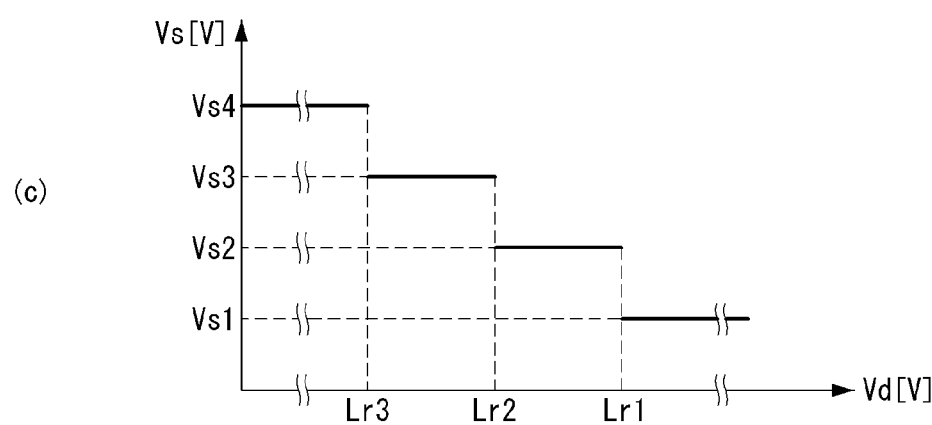
(c)

DISPLAY DEVICE

Pursuant to 35 U.S.C. § 119(a), this application claims the benefit of earlier filing date and right of priority to Korean Patent Application No. 10-2017-0084371, filed on Jul. 3, 2017, the contents of which are hereby incorporated by reference herein in its entirety.

BACKGROUND OF THE INVENTION

Field of the Invention

The present invention is related to a display device. In particular, the present invention is related to a display device that adjusts the characteristics of the electric power provided to the cable in accordance with the length of the cable connected to the display panel.

Discussion of the Related Art

As the information society advances, the demand for display devices increases in various forms. The display can be implemented using various types such as an LCD (Liquid Crystal Display Device), a PDP (Plasma Display Panel), an ELD (Electroluminescent Display), a VFD (Vacuum Fluorescent Display), an OLED (Organic Light Emitting Diode).

The display device may include a cable connecting the display panel and the power supply. Recently, the characteristics related to the cable in terms of the power supply have been studied.

SUMMARY OF THE INVENTION

Accordingly, an object of the present disclosure is to address the above-described and other problems.

The object of the present invention is to solve the above mentioned problems and other problems.

Another object of the present invention is to provide the display device sensing the length of the cable which connects the display panel and the power supply.

Another object of the present invention is to provide the display device in which the properties of electric power supplied to the cable from the power supply is controllable.

Another object of the present invention is to provide the display device of which the electric resistor for measure is mounted in the cable.

According to an aspect of the present invention, there is provided a display device comprising: a display unit providing an image; a control unit placed spaced apart from the display unit, the control unit providing the display unit with a electric power and a signal; a cable electrically connect the display unit and the control unit, the cable carrying the electric power and the signal; and a controller configured to control a property of the electric power in accordance with a length of the cable.

According to another aspect of the present invention, the property of the electric power may include an electric voltage of the electric power.

According to another aspect of the present invention, the controller may be configured to: acquire the length of the cable; and control the control unit such that the electric voltage of the electric power is greater as the length of the cable is longer.

According to another aspect of the present invention, the cable may include: a first cable connected to the display unit; and a second cable connected to the control unit, and wherein the first cable is electrically connected to the second cable.

According to another aspect of the present invention, the cable further may include an extension cable, wherein the extension cable connects the first cable and the second cable.

According to another aspect of the present invention, the cable may include a passive element having an impedance, and the controller may be configured to control the property of the electric power in accordance with the impedance of the passive element.

According to another aspect of the present invention, the passive element may include a passive element wire disposed on the cable along the cable.

According to another aspect of the present invention, the passive element may include a passive element lump disposed on a portion of the cable.

According to another aspect of the present invention, the passive element may include an electric resistor, and the controller may be configured to control the property of the electric power in accordance with an electric resistance of the electric resistor.

According to another aspect of the present invention, the cable may include: an electric power line carrying the electric power; and a signal line carrying the signal.

According to another aspect of the present invention, the electric power line and the signal line may be layered.

According to another aspect of the present invention, the control unit may include: a main board providing the cable with the signal; and a power supply providing the cable with the electric power.

According to another aspect of the present invention, the control unit may further include a voltage control board, and the voltage control board may acquire the length of the cable, and the voltage control board may control the power supply in accordance with the length of the cable.

According to another aspect of the present invention, the voltage control board may be incorporated in the main board.

According to another aspect of the present invention, the control unit may include a test voltage source and a first electric resistor, and the test voltage source, the first electric resistor, the voltage control board, and the cable may form an electric circuit.

According to at least one of embodiments of present invention, the length of the cable which connects the display panel and the power supply can be measured.

According to at least one of embodiments of present invention, the properties of electric power supplied to the cable from the power supply can be controllable.

According to at least one of embodiments of present invention, the electric resistor for measure can mounted in the cable.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings:

FIG. 8 is a cross-sectional view of a cable according to an embodiment of the present invention.

FIG. 9 illustrates an extension of a cable in accordance with an embodiment of the present invention.

FIGS. 14 to 17 are flowcharts and graphs related to power driving of a display device according to an embodiment of the present invention.

DETAILED DESCRIPTION OF THE EMBODIMENTS

Figure 1:
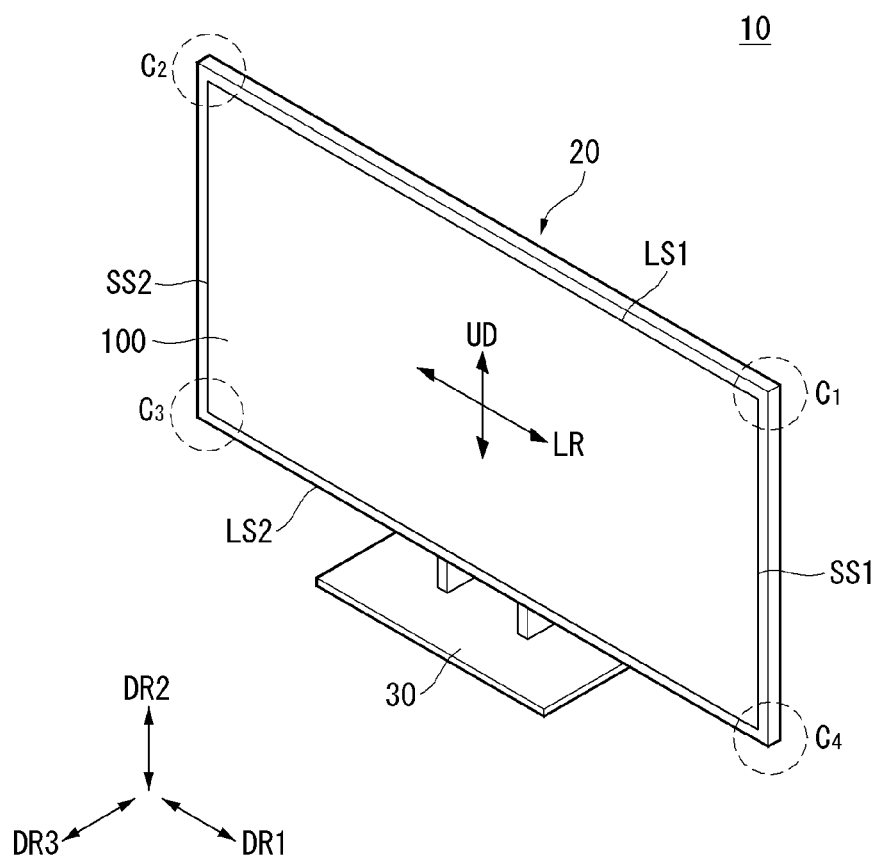
FIGS. 1 to 6 are diagrams showing a display device according to an embodiment of the present invention.

Reference will now be made in detail embodiments of the invention examples of which are illustrated in the accompanying drawings. Since the present invention may be modified in various ways and may have various forms, specific embodiments are illustrated in the drawings and are described in detail in the present specification. However, it should be understood that the present invention are not limited to specific disclosed embodiments, but include all modifications, equivalents and substitutes included within the spirit and technical scope of the present invention.

The terms 'first', 'second', etc. may be used to describe various components, but the components are not limited by such terms. The terms are used only for the purpose of distinguishing one component from other components. For example, a first component may be designated as a second component without departing from the scope of the present invention. In the same manner, the second component may be designated as the first component.

The term "and/or" encompasses both combinations of the plurality of related items disclosed and any item from among the plurality of related items disclosed.

When an arbitrary component is described as "being connected to" or "being linked to" another component, this should be understood to mean that still another component(s) may exist between them, although the arbitrary component may be directly connected to, or linked to, the second component. In contrast, when an arbitrary component is described as "being directly connected to" or "being directly linked to" another component, this should be understood to mean that no component exists between them.

The terms used in the present application are used to describe only specific embodiments or examples, and are not intended to limit the present invention. A singular expression can include a plural expression as long as it does not have an apparently different meaning in context.

In the present application, the terms "include" and "have" should be understood to be intended to designate that illustrated features, numbers, steps, operations, components, parts or combinations thereof exist and not to preclude the existence of one or more different features, numbers, steps, operations, components, parts or combinations thereof, or the possibility of the addition thereof.

Unless otherwise specified, all of the terms which are used herein, including the technical or scientific terms, have the same meanings as those that are generally understood by a person having ordinary knowledge in the art to which the present invention pertains. The terms defined in a generally used dictionary must be understood to have meanings identical to those used in the context of a related art, and are not to be construed to have ideal or excessively formal meanings unless they are obviously specified in the present application.

The following exemplary embodiments of the present invention are provided to those skilled in the art in order to describe the present invention more completely. Accordingly, shapes and sizes of elements shown in the drawings may be exaggerated for clarity.

A display panel applicable to the present invention may include an organic light emitting diode (OLED), a plasma display panel (PDP), a field emission display (FED), a liquid crystal panel (Liquid Crystal Display, LCD).

Referring to FIG. 1, the display device 10 may include a display unit 20 and a pedestal 30. The display unit 20 may have a planar shape as a whole. The pedestal 30 may extend downward from the display unit 20. The pedestal 30 can support the display unit 20.

The display unit 20 may include a first long side LS1 and a second long side LS2 opposite to the first long side LS1. The display unit 20 may include a first short side SS1 and a second short side SS2 opposite to the first short side SS1. The first short side SS1 may be adjacent to both the first long side LS1 and the second long side LS2.

An area adjacent to the first short side SS1 may be referred to as a first side area. An area adjacent to the second short side SS2 may be referred to as a second side area. An area adjacent to the first long side LS1 may be referred to as a third side area. An area adjacent to the second long side LS2 may be referred to as a fourth side area.

The lengths of the first and second long sides LS1 and LS2 may be longer than the lengths of the first and second short sides SS1 and SS2 for the convenience of explanation. It is also possible that the lengths of the first and second long sides LS1 and LS2 are substantially equal to the lengths of the first and second short sides SS1 and SS2.

The display unit 20 may include a display panel 100 for displaying an image. The display panel 100 may form a front surface of the display unit 20. The display panel 100 can display an image toward the front of the display unit 20.

The first direction DR1 may be a direction along to the long sides LS1 and LS2 of the display unit 20. The second direction DR2 may be a direction along to the short sides SS1 and SS2 of the display unit 20.

The third direction DR3 may be a direction normal to the first direction DR1 and/or the second direction DR2.

The first direction DR1 may be referred to as a horizontal direction. The first direction DR1 may be a virtual horizontal axis. The second direction DR2 may be referred to as a vertical direction. The second direction DR2 may be a virtual vertical axis. The third direction DR3 may be a back-and-forth direction. The third direction DR3 may be another virtual horizontal axis.

A side on which the display unit 20 displays the image may be referred to as a 'forward direction' or a 'front side' of the display unit 20. A side on which the image can not be viewed may be referred to as a 'rearward direction' or a 'rear side' of the display unit 20.

From the viewpoint of the front side of the display unit 20, the first long side LS1 may be referred to as an upper side or an upper surface, the second long side LS2 side may be referred to as a lower side or a lower surface, the first short side SS1 may be referred to as a right side or the right side, and the second short side SS2 may be referred to as a left side or a left side.

The first long side LS1, the second long side LS2, the first short side SS1 and the second short side SS2 may be referred to as an edge of the display unit 20. The area where the first long side LS1, the second long side LS2, the first short side SS1, and the second short side SS2 meet with each other may be referred to as a corner. For example, the area where the first long side LS1 and the first short side SS1 meet may be referred to as a first corner C1. The area where the first long side LS1 and the second short side SS2 meet may be referred to as a second corner C2. The area where the second short side SS2 and the second long side LS2 meet may be referred to as a third corner C3. The area where the second long side LS2 and the first short side SS1 meet may be referred to as a fourth corner C4.

The direction from the first short side SS1 to the second short side SS2 or the direction from the second short side SS2 to the first short side SS1 may be referred to as the left and right direction LR. The direction from the first long side LS1 to the second long side LS2 or the direction from the second long side LS2 to the first long side LS1 may be referred to as the up and down direction UD.

Figure 2:
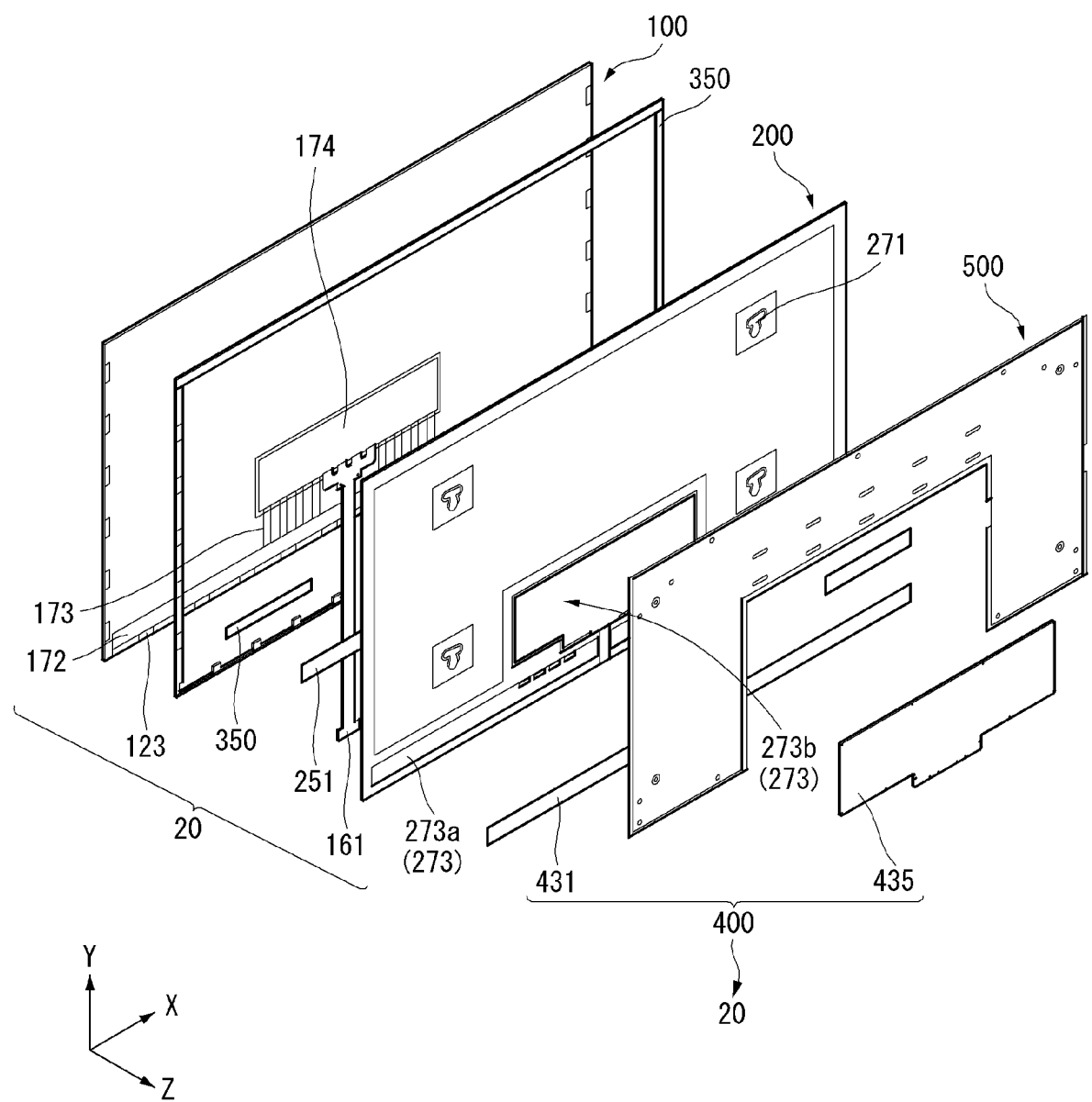

Referring to FIG. 2, the display device 10 may include a display unit 20 and a wall bracket 500. The display unit 20 may include a display panel 100, a module cover 200, and a PCB cover 400.

The display panel 100 may be positioned at the front side of the display unit 20. The display panel 100 may display an image or an image. The display panel 100 may include a plurality of pixels. The plurality of pixels can display an image by outputting RGB (red, green or blue). The display panel 100 may comprise an active area in which an image is displayed and a de-active area in which no image is displayed.

The display panel 100 may include an organic light emitting diode (OLED). The display panel 100 can emit light by itself. The display panel 110 may have a very thin thickness.

At least one source PCB 172 and an interface PCB 174 may be disposed on the back side of the display panel 100. The interface PCB 174 may be spaced apart from the at least one source PCB 172. At least one source PCB 172 may be adjacent to the edge of the display panel 100 relative to the interface PCB 174. At least one source PCB 172 may be provided in plurality. The plurality of source PCBs 172 may be disposed apart from each other. At least one PCB connector 173 may be disposed on the rear side of the display panel 100. The PCB connector 173 may connect the interface PCB 174 and the source PCB 172 electrically.

The interface PCB 174 may mount wires for carrying digital video data and timing control signals transmitted from the outside of the display unit 20.

The source PCB 172 may electrically connect the interface PCB 174 and the display panel 100. The source COF (Chip On Film) 123 may connect the source PCB 172 and the display panel 100. The source COF 123 may extend from the edge of the display panel 100 to the source PCB 172. The source COF 123 may mount a data integrated circuit. The source COF 123 and the source PCB 172 may be integrally formed.

The adhesive sheet 350 may be positioned on the rear surface of the display panel 100. The adhesive sheet 350 may couple the display panel 100 and the module cover 200. The adhesive sheet 350 may be in the form of a rectangular photo-frame having a hollow portion. The adhesive sheet 350 may be positioned along the edges of the display panel 100.

The insulating sheet 251 may be positioned between the display panel 100 and the module cover 200. The insulating sheet 251 may be attached to the module cover 200. The insulating sheet 251 can protect the source PCB 172 from electromagnetic noise. The insulating sheet 251 may include an insulating material.

The module cover 200 may be provided on the rear surface of the display panel 100. The module cover 200 can be attached to the display panel 100 by the adhesive sheet 350. The module cover 200 can support the rear surface of the display panel 100. The module cover 200 may provide rigidity to the display panel 100. The module cover 200 may comprise a lightweight and highly rigid material. For example, the module cover 200 may comprise aluminum.

The tilting hole 271 may be formed in the module cover 200. The tilting hole 271 can receive a hook formed on the wall bracket 500. The hook formed on the wall bracket 500 may be in the shape of a protrusion.

The wall bracket 500 may be installed at a structure such as a wall. The display unit 20 can be supported on the wall bracket 500. For example, when the tilting hole 271 receives the hook formed in the wall bracket 500, the display unit 20 can be hanged on the wall bracket 500.

The opening 273 may be formed in the module cover 200. The opening 273 may include a first opening 273a and a second opening 273b.

The first opening 273a may correspond to the source PCB 172. For example, the first opening 273a may be adjacent to an edge of the module cover 200. The first opening 273a may receive the source PCB 172.

The second opening 273b may correspond to the interface PCB 174. For example, the second opening 273b may be located at the central portion of the module cover 200. The second opening 273b may receive the interface PCB 174.

The PCB cover 400 may be located behind the interface PCB 174 or behind the source PCB 172. The PCB cover 400 may include a first PCB cover 431 and a second PCB cover 435. The first PCB cover 431 may be located behind the source PCB 172. The second PCB cover 435 may be located behind the interface PCB 174. The first PCB cover 431 may cover the source PCB 172. The second PCB cover 435 may cover the interface PCB 174. The PCB cover 400 may include an insulating material. The PCB cover 400 may protect the source PCB 172 and the interface PCB 174 from leakage electric currents.

Figure 3:
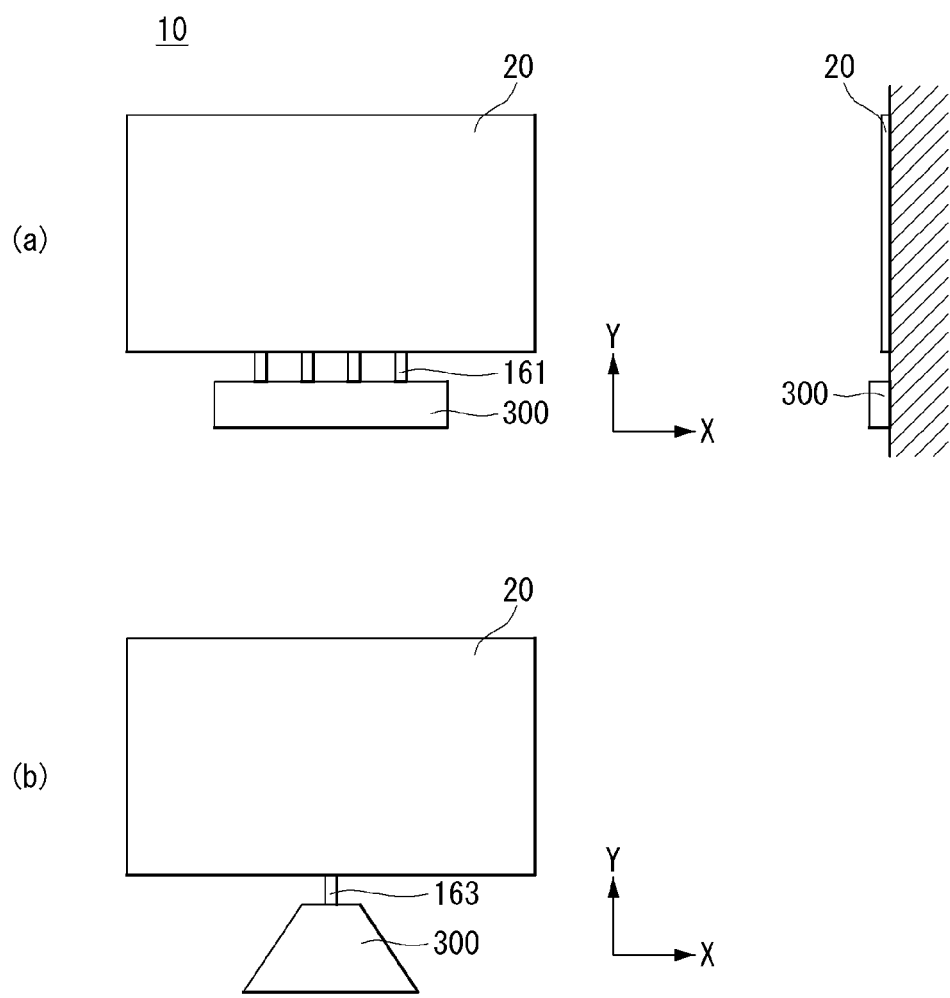

Referring to FIG. 3, the display device 10 may include a display unit 20 and a control unit 300. The control unit 300 may be electrically connected to the display unit 20.

The control unit 300 may provide signals and/or power to the display unit 20. The control unit 300 may include components that drive the display device 10. The case of the control unit may shield the components. For example, the case of the control unit 300 may shield at least one printed circuit board (PCB).

Referring to FIG. 3 (a), the display device 10 may include a cable 161. The cable 161 may be a flat cable 161. The flat cable 161 can electrically connect the display unit 20 and the control unit 300. A plurality of flat cables 161 may be provided.

Referring to FIG. 3 (b), the display device 10 may include a cable 163. The cable 163 may be a circular cable 163. The circular cable 163 may be thicker than the flat cable 161.

Figure 4:
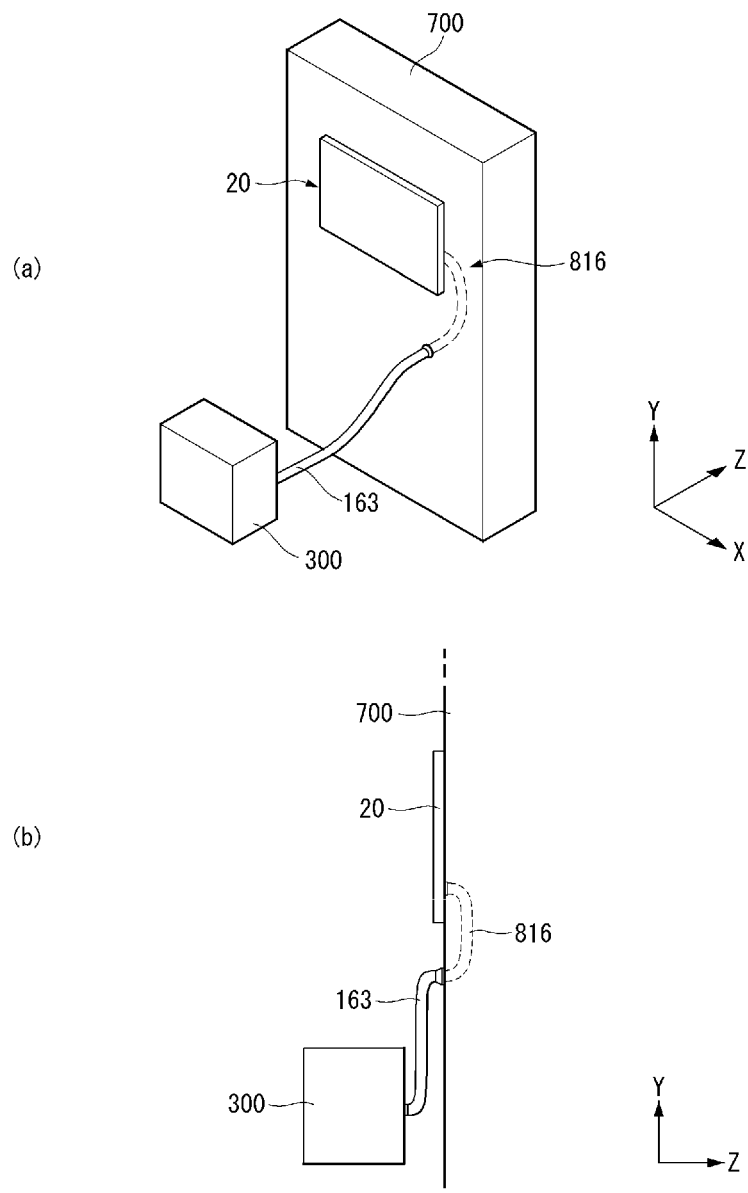

Referring to FIG. 4, the display unit 20 may be attached to the attachment surface 700. Alternatively, the display unit 20 may be attached to a wall bracket 500 (see FIG. 2) fixed to the attachment surface 700. The attachment surface 700 may be a surface of wall.

The electric wire 816 can penetrate the attached surface 700. The electric wire 816 can electrically connect the display unit 20 and the cable 163. The cable 163 may be a circular cable 163. The cable 163 can be exposed to the outside.

Figure 5:
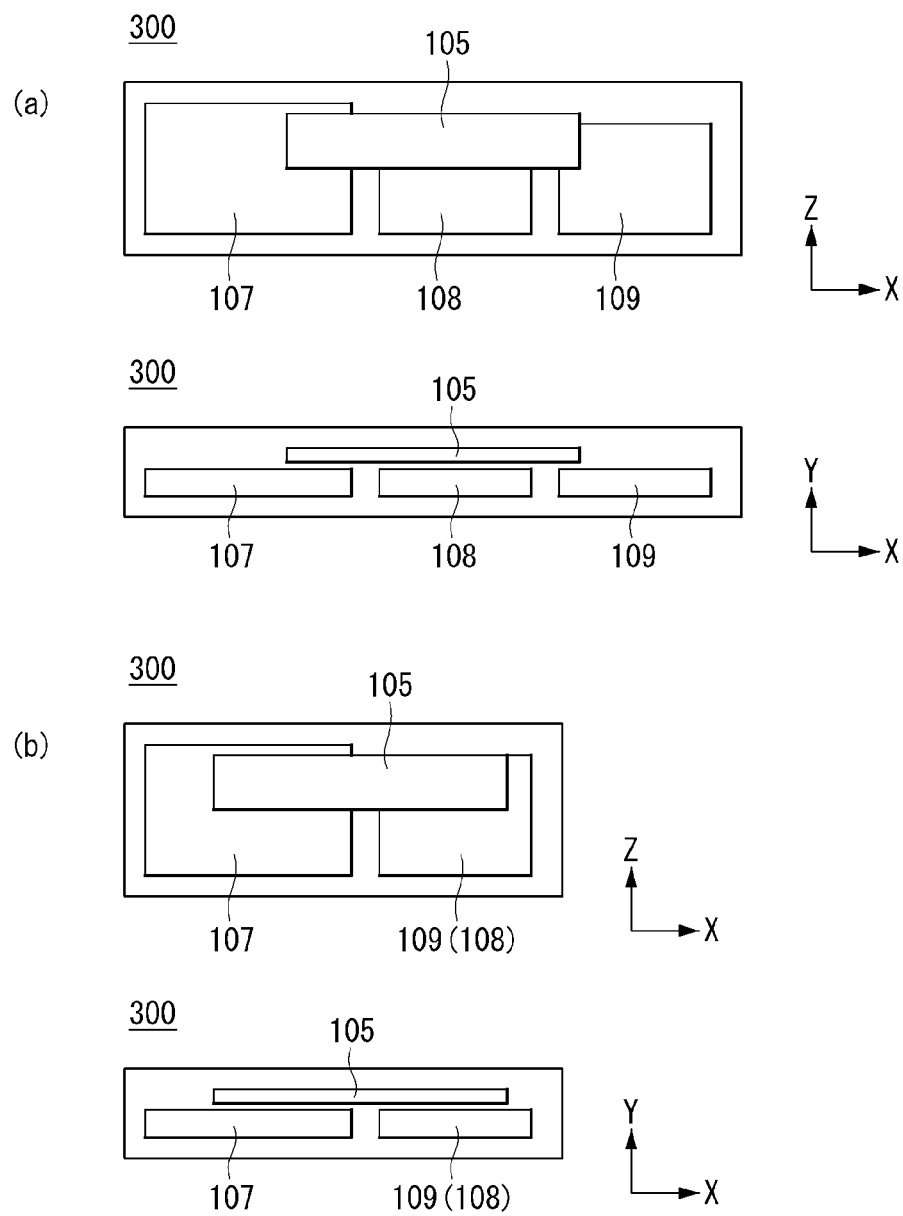

Referring to FIG. 5, the control unit 300 may include a main board 109. The main board 109 can control the display unit 20 (see FIG. 6).

The control unit 300 may include a power supply 107. The power supply 107 can be supplied with AC power. The power supply 107 can convert AC power to DC power. The power supply 107 may provide DC power.

The control unit 300 may include a T-CON board (timing control board) 105. The T-CON board 105 can supply a timing signal and a video signal to the display unit 20 (see FIG. 3).

Referring to FIG. 5 (a), the control unit 300 may include a voltage control board 108. The voltage control board 108 may be connected to the power supply 107. The voltage control board 108 may adjust the characteristics of the power provided by the power supply 107. For example, the voltage control board 108 may control the voltage of the power provided by the power supply 107. The voltage control board 108 may be connected to the main board 109.

Referring to FIG. 5 (b), the voltage control board 108 of the control unit 300 may be incorporated in the main board 109. In this case, the voltage control board 108 may stand for a module that controls the power supply 107 among a plurality of modules of the main board 109.

Figure 6:
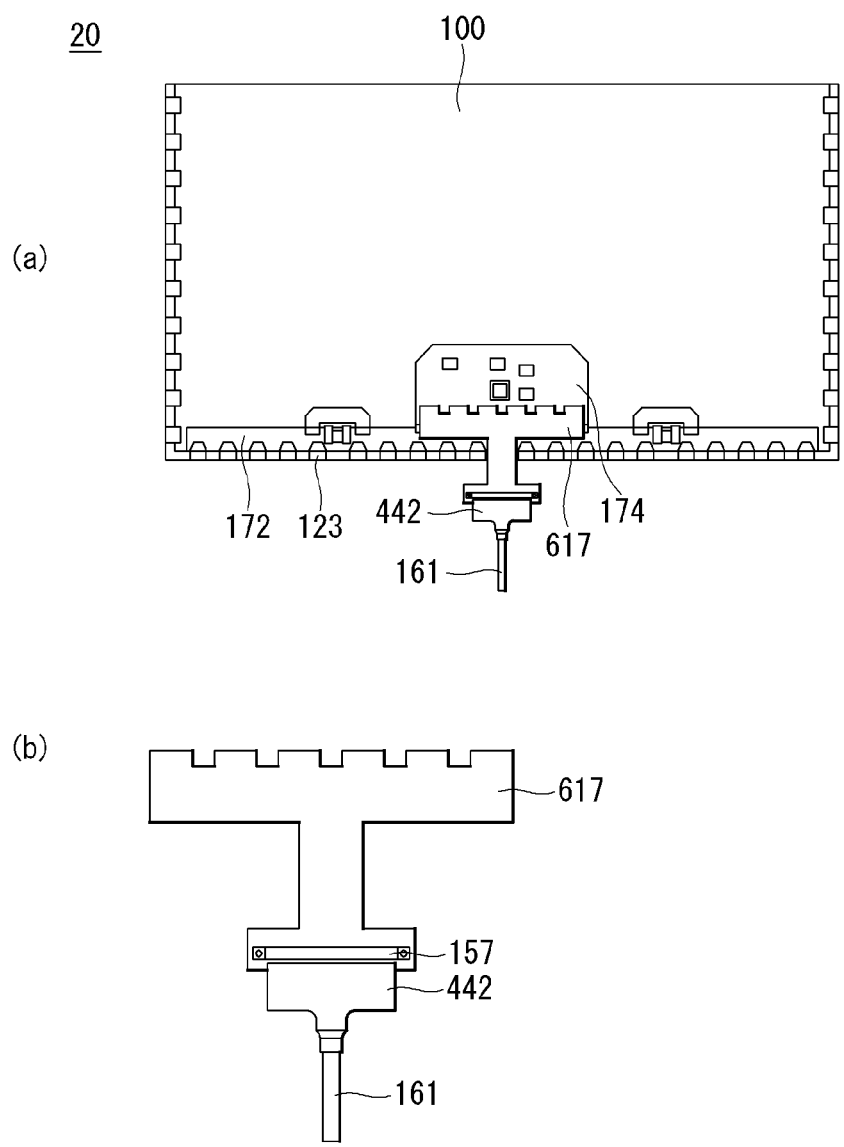

Referring to FIG. 6, the variable FPC 617 can electrically connect the interface PCB 174 and the plug 442. The variable FPC 617 may have the same or similar structure and function as the interface PCB 174.

An end of the variable FPC 617 may be connected to the interface PCB 174. The variable FPC 617 may be connected to the interface PCB 174 at a plurality of points. The other end of the variable FPC 617 may be connected to the plug 442. And the connector 157 may be positioned at the other end of the variable FPC 617.

The connector 157 can electrically connect the variable FPC 617 and the plug 442. The plug 442 can electrically connect the connector 157 and the cable 161. The power and/or signal provided from the cable 161 may go through the plug 442, the connector 157, the variable FPC 617, the interface PCB 174, the source PCB 172, and the source COF 123 sequentially, and may finally arrive at the display panel 100.

Figure 7:
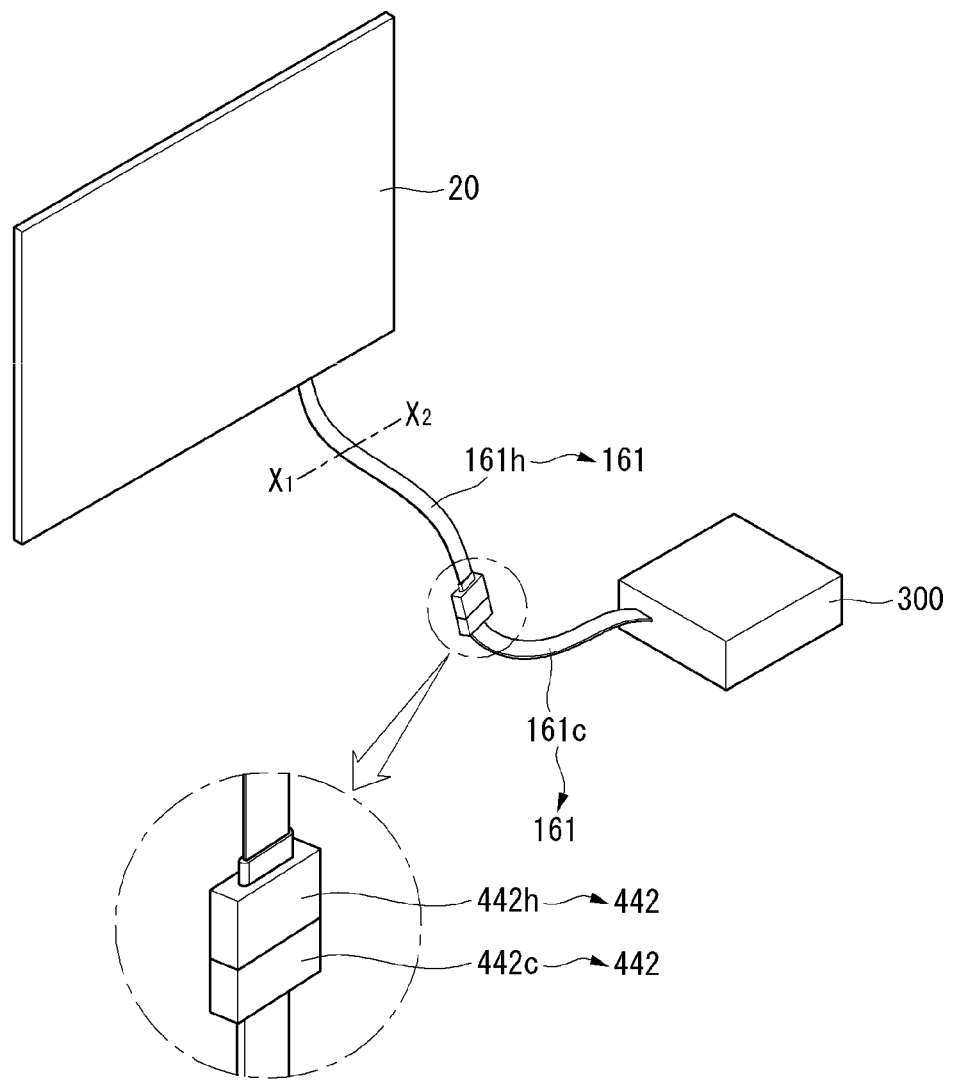
FIG. 7 is a diagram illustrating a connection relationship between a display unit and a control unit according to an embodiment of the present invention.

Referring to FIG. 7, the cable 161 can electrically connect the display unit 20 and the control unit 300. The cable 161 may be a flat cable 161. The cable 161 may include a first cable 161h and a second cable 161c.

The first cable 161h can electrically connect the display unit 20 and the second cable 161c. The second cable 161c can electrically connect the first cable 161h and the control unit 300.

The plug 442 can connect the first cable 161h and the second cable 161c. The plug 442 may include a first plug 442h and a second plug 442c. The first plug 442h may be connected to the first cable 161h. The second plug 442c may be connected to the second cable 161c. The first plug 442h and the second plug 442c may be coupled to each other to be electrically connected.

FIG. 8 is a cross-sectional view of the cable taken along the line X1-X2 in FIG. 7.

Referring to FIG. 8, the cable 161 may include a signal line 278, a first power line 274, and a second power line 276.

The power lines 274 and 276 may refer to at least one of the first power line 274 and the second power line 276. The first power line 274 and the second power line 276 may be optimal for transmitting power of different voltages. For example, the first power line 274 may be optimal for carrying a power of 12V voltage. For example, the second power line 276 may be optimal for carrying a power of 24V voltage. The signal line 278 can transmit an electric signal.

The power lines 274 and 276 and the signal line 278 may have impedance. The cable 161 may have an impedance. The cable 161 may consume power in the course of transmitting electric power.

Referring to FIG. 8 (a), the power lines 274 and 276 and the signal line 278 can form the same layer. The first power line 274 and the second power source 278 may form the same layer. In this case, the cable 161 may have a relatively thin thickness. In this case, the width of the cable 161 may be the first width FFW1.

Referring to FIG. 8 (b), the power lines 274 and 276 and the signal line 278 may be arranged in a stack structure. The first power line 274 and the second power line 276 may be arranged in a stacked structure. In this case, the cable 161 may have a relatively thick thickness. In this case, the cable 161 may have a relatively small width. In this case, the width of the cable 161 may be the second width FFW2. The second width FFW2 may be smaller than the first width FFW1.

Referring to FIG. 9, the cable 161 may include a first cable 161h, a second cable 161c, and an extension cable 161e. The first cable 161h may be connected to the display unit 20. The second cable 161c may be connected to the control unit 300. The extension cable 161e can connect the first cable 161h and the second cable 161c.

Referring to FIG. 9 (a), the length of the cable 161 may be sum of the length of the first cable 161h, the length of the second cable 161c, and the length of the extension cable 161e. The length of the cable 161 shown in FIG. 9 (a) may be larger than the length of the cable 161 shown in FIG. 7.

Referring to FIG. 9 (b), the extension cable 161e may include a first extension cable 161e1 and a second extension cable 161e2. The first extension cable 161e1 may be connected to the first cable 161h. The second extension cable 161e2 may be connected to the second cable 161c. The first extension cable 161e1 and the second extension cable 161e2 may be connected to each other. Thus, the length of the extension cable 161e can be extended.

The length of the cable 161 may correspond to the distance between the display unit 20 and the control unit 300. If the distance between the display unit 20 and the control unit 300 is relatively small, a cable 161 having a relatively short length may be required. If the distance between the display unit 20 and the control unit 300 is relatively long, a cable 161 having a relatively long length may be required.

The distance between the display unit 20 and the control unit 300 may vary depending on the place where the display device 10 is installed and/or the situation. In case that the cable 161 is modularized, the overall length of the cable 161 can be easily adjusted. The overall length of the cable 161 can be adjusted in correspondence with the distance between the display unit 20 and the control unit 300.

The cable 161 may have an impedance. Impedance can include electrical resistance. The impedance of the cable 161 may be proportional to the length of the cable 161. The longer length of the cable 161, the greater impedance of the cable 161 may be. The longer length of the cable 161, the greater power the cable 161 may consume. If the power consumed in the cable 161 increases, the voltage of the power that the cable 161 provides to the display unit 20 can be lowered. If the voltage of the power supplied to the display unit 20 is lowered, the brightness of the image generated by the display unit 20 may be lowered.

If the voltage of the power supplied to the cable 161 becomes large in case that the length of the cable 161 is increased, the voltage of the power supplied to the display unit 20 can be changed relatively small. When the power supplied to the cable 161 becomes large, the power consumed in the cable 161 can be compensated.

Figure 10:
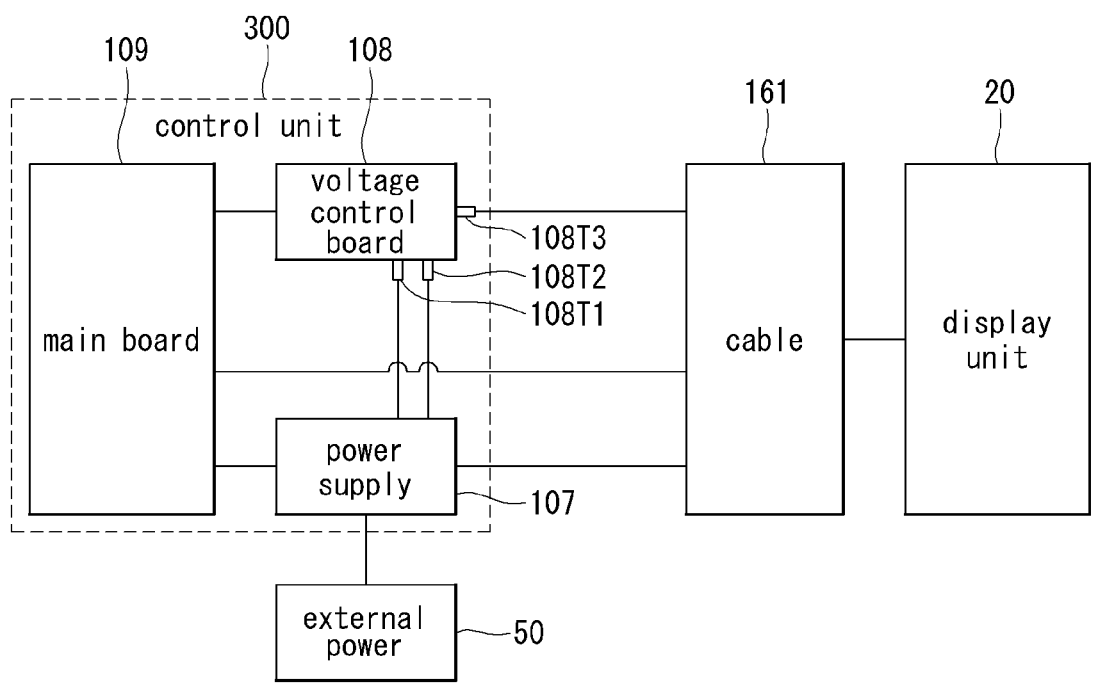
FIG. 10 is a schematic diagram of a display device according to an embodiment of the present invention.

FIG. 10 is a schematic diagram of a control unit 300, a cable 161, and a display unit 20. The control unit 300 may include a main board 109, a voltage control board 108, and a power supply 107.

The main board 109 may control the voltage control board 108 and the power supply 107. For the convenience of explanation, the T-CON board 105 (see FIG. 5) may be omitted. The function of the T-CON board 105 may be apprehended as being incorporated in the main board 109. The main board 109 may be connected to the cable 161. The main board 109 can provide an electrical signal to the cable 161. The electric signal provided to the cable 161 can be transmitted to the display unit 20.

The power supply unit 107 may be controlled by the main board 109 and the voltage control board 108. The power supply 107 may be electrically connected to the external power 50. The power supply 107 can receive AC power from the external power 50. The power supply 107 can convert AC power into DC power. The power supply 107 can provide DC power to the cable 161. The power supply 107 can supply DC power to the cable 161 via the main board 109.

The cable 161 can connect the control unit 300 and the display unit 20. The cable 161 can be provided with electric power from the control unit 300. The cable 161 can transmit electric power to the display unit 20.

The voltage control board 108 may include a first terminal 108T1, a second terminal 108T2, and a third terminal 108T3. The first terminal 108T1, the second terminal 108T2, and the third terminal 108T3 may be, for example, a GPIO.

The first terminal 108T1 and the second terminal 108T2 may be connected to the power supply 107. The first terminal 108T1 and the second terminal 108T2 can provide a signal (electrical signal) to the power supply 107. The signal provided by the first terminal 108T1 and the second terminal 108T2 to the power supply 107 may be in the form of an electric voltage.

The voltage of the electric power provided to the cable 161 by the power supply 107 may depend on the voltage of the first terminal 108T1 and the voltage of the second terminal 108T2. The voltage of the first terminal 108T1 or the voltage of the second terminal 108T2 may have a low state or a high state. For example, the voltage of the power supplied to the cable 161 from the power supply unit 107 may depend on the voltage states of the first terminal 108T1 and the second terminal 108T2.

The third terminal 108T3 may be connected to the cable 161. The third terminal 108T3 can be used for measuring the length of the cable 161. The length of the cable 161 can be sensed by measuring the impedance of the cable 161. For example, the length of the cable 161 can be sensed by measuring the electrical resistance of the cable 161. The voltage applied to the third terminal 108T3 may vary depending on the length of the cable 161. For example, the longer the cable 161, the smaller the voltage applied to the third terminal 108T3 may be.

Figure 11:
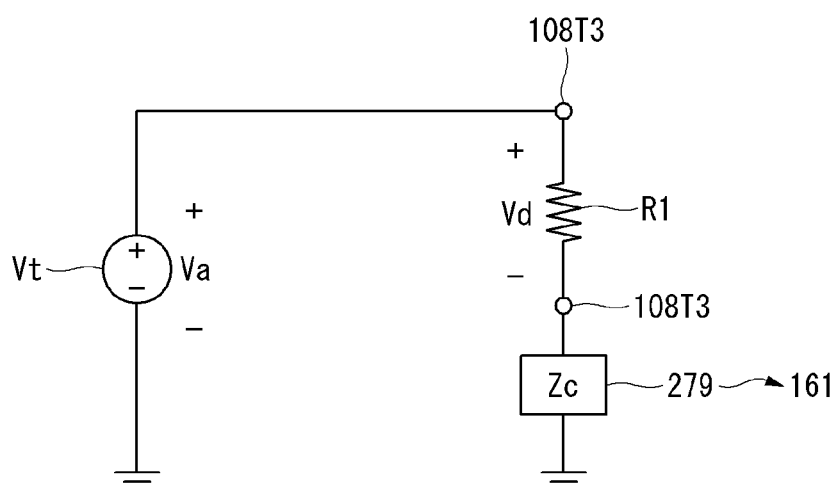
FIG. 11 is a schematic diagram of an electric circuit for measuring characteristics of a cable in a display device according to an embodiment of the present invention.

FIG. 11 is an electric circuit diagram including the third terminal 108T3. The third terminal 108T3 may be connected to the cable 161. The cable 161 may have an impedance Zc.

The impedance Zc may stand for the impedance of the cable 161 itself. Or the impedance Zc may refer to the impedance of the passive element 279 included in the cable 161.

The passive element 279 may include at least one of an electric resistor, a capacitor, and an inductor. The impedance Zc may include at least one of an electric resistance, a capacitance, and an inductance.

The passive element 279 may include an electric resistor. The impedance Zc may include the electrical resistance of the cable 161. The third terminal 108T3 may be connected to the first electric resistor R1. The first electric resistor R1 may mean an electric resistance value or an electric resistance element. The first electric resistor R1 may be connected to the test voltage source Vt. The test voltage source Vt may provide the applied voltage Va to the first electric resistor R1.

The first electric resistor R1 and the cable 161 can be connected in series with respect to the test voltage source Vt. The applied voltage Va can be distributed to the first electric resistor R1 and the cable 161. The voltage applied to the first electric resistor R1 may be referred to as a branch voltage Vd. The branch voltage Vd can be smaller as the impedance Zc of the cable 161 or the electrical resistance of the cable 161 is larger. The impedance Zc of the cable 161 or the electric resistance of the cable 161 may become larger as the cable 161 becomes longer. The branch voltage Vd may be smaller as the cable 161 is longer.

The passive element 279 may include a capacitor. The impedance Zc may include the capacitance of the cable 161. The test voltage source Vt may have a voltage distribution of a step-function. Or the test power source Vt may be switched.

A voltage may be applied to the first electric resistor R1 and the passive element 279 by the test voltage source Vt. The test voltage source Vt at a steady state may be a constant. The time-constant of the circuit may be dependent on the capacitance of the passive element 279. The time-constant of the circuit can be sensed by measuring the branch voltage Vd along time.

The passive element 279 may include an inductor. The impedance Zc may include an inductance of the cable 161. The voltage of the test voltage source Vt at a steady state may be a constant. The time-constant of the circuit can be dependent on the inductance of the passive element 279. The time-constant of the circuit can be sensed by measuring the branch voltage Vd along time.

Figure 12:
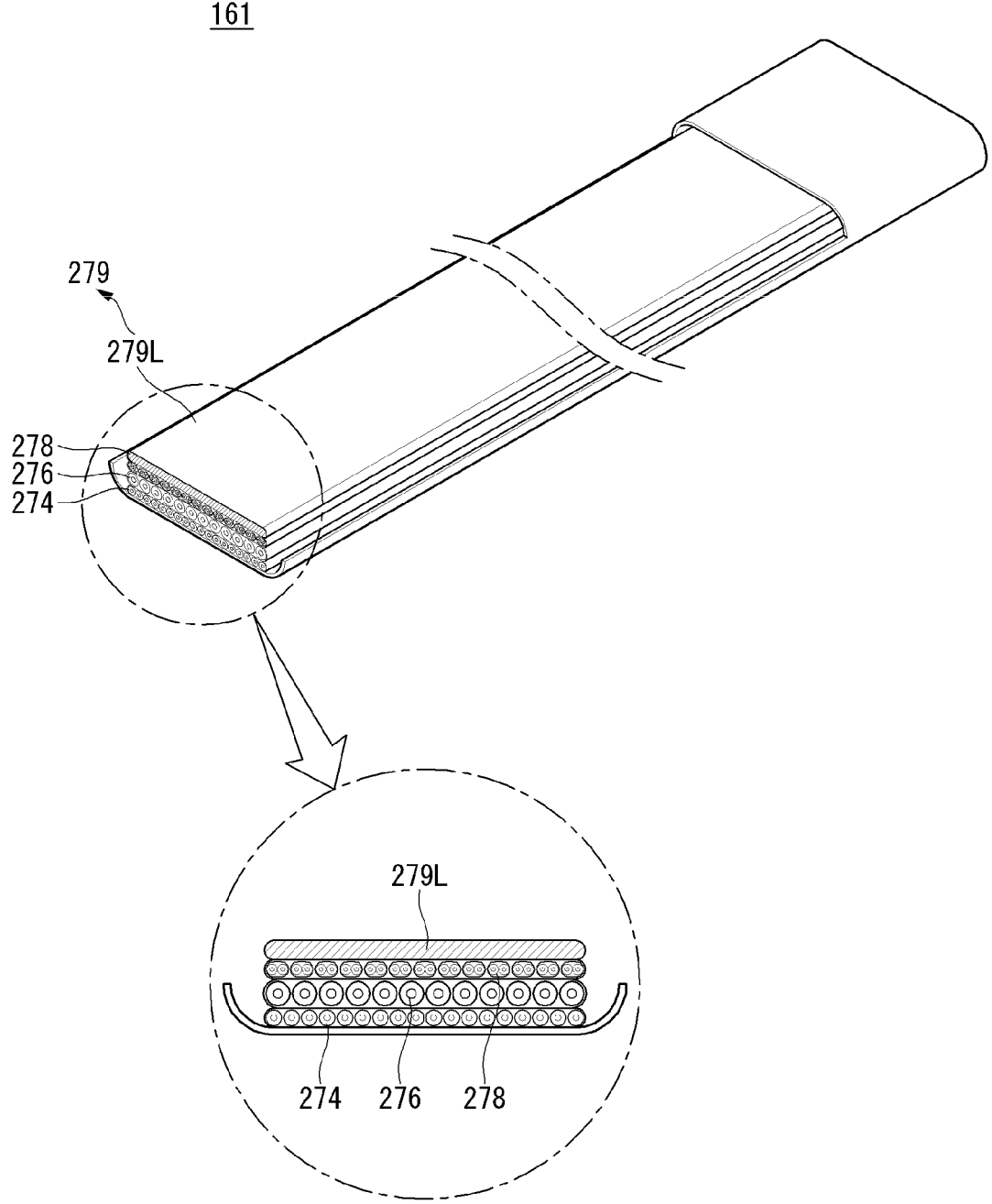
FIGS. 12 and 13 show various embodiments of passive elements mounted in a cable.

Referring to FIG. 12, the cable 161 may include a signal line 278, a first power line 274, a second power line 276, and a passive element 279. The passive element 279 may have impedance. The passive element 279 may include a passive element wire 279L. The cover of the cable 161 in FIGS. 12 and 13 may be partially removed for convenience of explanation.

The passive element wire 279L may have the shape of a wire. The passive element wire 279L may have the shape of a flat wire. The passive element wire 279L, the first power line 274, the second power line 276, and the signal line 278 may form a plurality of layers. The passive element wire 279L, the first power line 274, the second power line 276 and the signal line 278 may be arranged in a stack structure.

The passive element 279 may be an electric resistor. The passive element 279 may have an electric resistance. Most of the impedance of the passive element 279 may be electrical resistance.

The electrical resistance of the passive element wire 279L may correspond to the length of the cable 161. By measuring the electrical resistance of the passive element wire 279L, the length of the cable 161 can be sensed.

The passive element 279 may be a capacitor. The passive element 279 may have a capacitance. Most of the impedance of passive element 279 may be capacitive.

The capacitance of the passive element wire 279L may correspond to the length of the cable 161. When the capacitance of the passive element wire 279L is measured, the length of the cable 161 can be sensed.

The passive element 279 may be an inductor. The passive element 279 may have an inductance. Most of the impedance of the passive element 279 may be inductive.

The inductance of the passive element wire 279L may correspond to the length of the cable 161. By measuring the inductance of the passive element wire 279L, the length of the cable 161 can be sensed.

Figure 13:
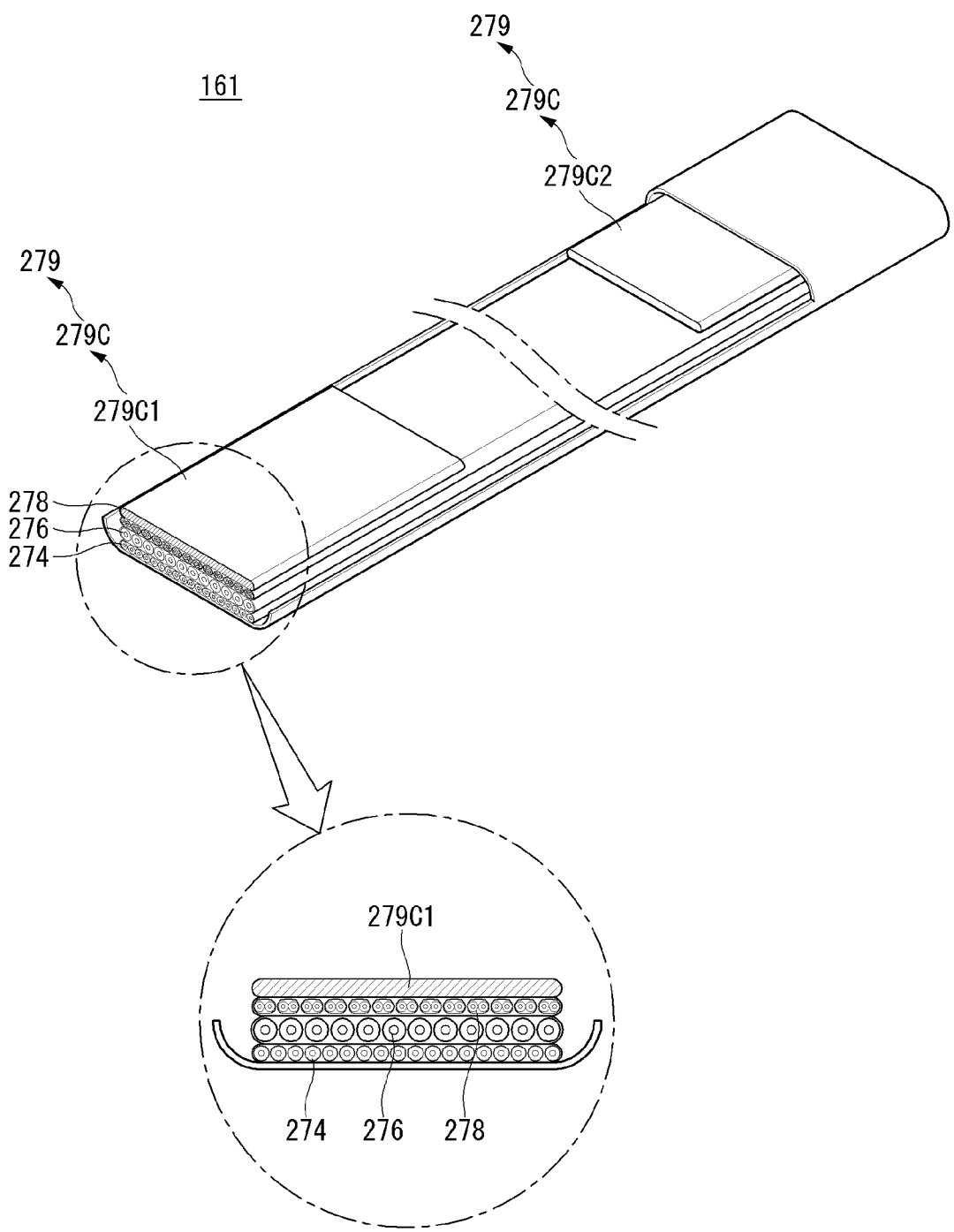

Referring to FIG. 13, the cable 161 may include a signal line 278, a first power line 274, a second power line 276, and a passive element 279. The passive element 279 may include a passive element lump 279C. The passive element lump 279C may be disposed in a part of the cable 161.

Passive element lump 279C may be distributed along cable 161. The passive device lump 279C may be provided in plurality. For example, the passive element 279 may include a first passive element lump 279C1 and a second passive element lump 279C2.

The plurality of passive element lumps 279C may be spaced apart from each other. For example, the first passive element lump 279C1 may be disposed apart from the second passive element lump 279C2. The plurality of passive element lumps 279C may be sequentially electrically connected. For example, the first passive element lump 279C1 may be electrically connected to the second passive element lump 279C2. The passive element lump 279C may include at least one of an electric resistor, a capacitor, and an inductor.

In this paragraph, the relationship between the impedance measurement of the passive element 279 and the sensing of the length of the cable 161 can be explained by using passive element lump 279C with electrical resistance. The electric resistance of the first passive element lump 279C1 may be a first resistance [ohm]. The electric resistance of the second passive element lump 279C2 may be the second resistance [ohm]. The passive element lump 279C may be useful in the modularized cable 161. For example, the cable 161 may include a first cable module and a second cable module, which are modularized cables. The electrical resistance of the first cable module may be the same as the electrical resistance of the second cable module. In case that the cable 161 comprises a first cable module, the electrical resistance of the cable 161 may be the electrical resistance of the first cable module. In case that the cable 161 includes the first cable module and the second cable module, the electrical resistance of the cable 161 may be the sum of the electrical resistance of the first cable module and the electrical resistance of the second cable module. When the electrical resistance of the cable 161 is measured, the number of modules of the cable 161 can be sensed. When the electrical resistance of the cable 161 is measured, the length of the cable 161 can be sensed.

Figure 14:
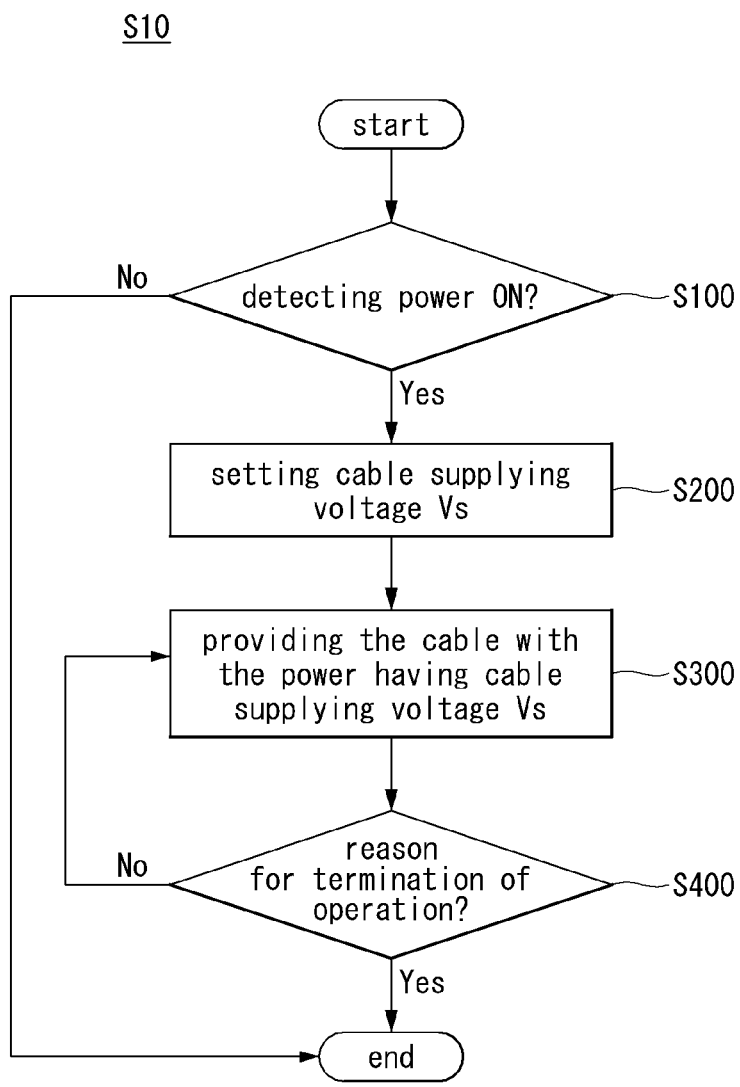
Figure 15:
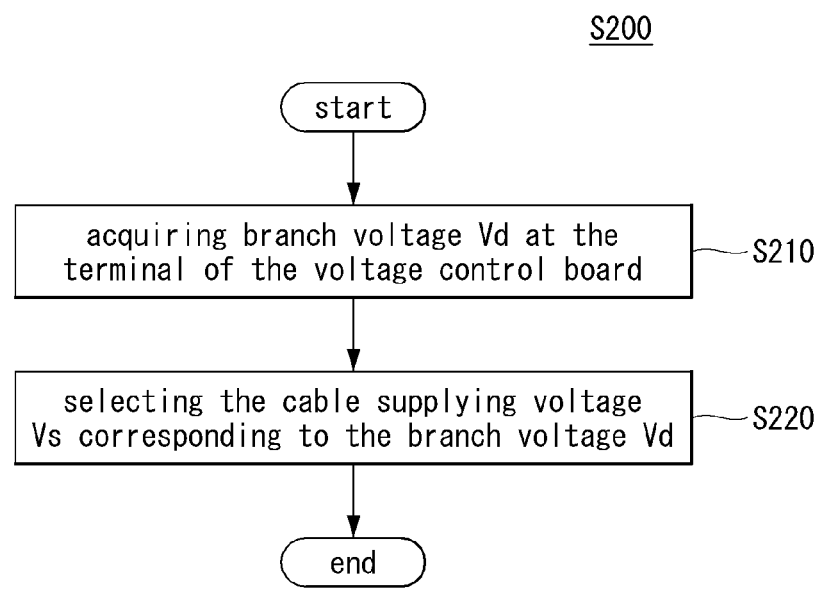
Figure 16:
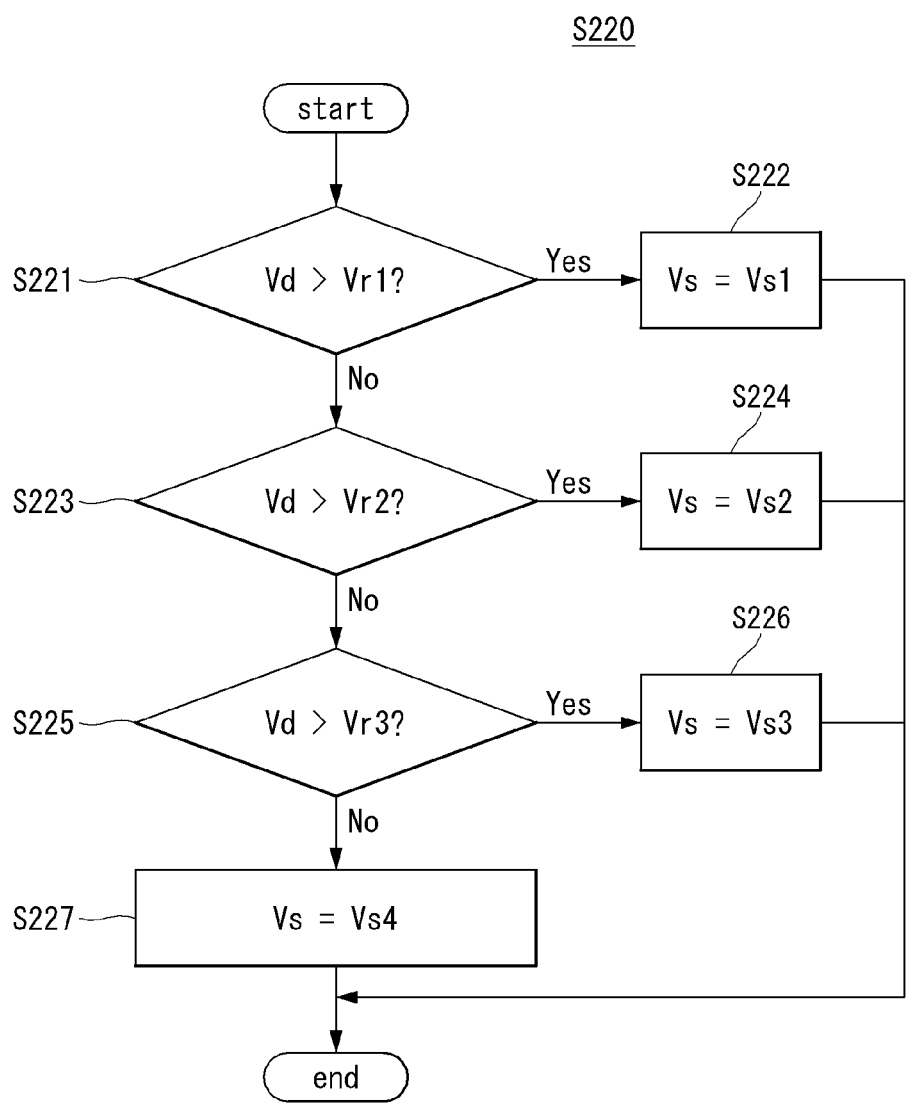

Referring to FIG. 14, a flow chart showing a power control method S10 of the display device 10 (see FIG. 3) can be observed. FIGS. 14 to 16 can be described with reference to FIGS. 3 and 10 to 13.

The power control method S10 of the display device 10 may include a 'detecting power ON' S100 for determining whether the control unit 300 is switched on. At this step S100, the main board 109 can detect whether or not the control unit 300 is turned on. The main board 109 may be referred to as a 'controller' of the display device 10.

The power control method S10 of the display device 10 may include a 'setting cable supplying voltage Vs' for setting a voltage to be provided to the cable 161. At this step S200, the main board 109 or the voltage control board 108 can set the voltage Vs, which is the voltage of the power that the power supply unit 107 provides to the cable 161. The controller of the display device 10 may stand for at least one of the main board 109 and the voltage control board 108. The controller can set the supply voltage Vs provided to the cable 161 by the power supply unit 107 when the power supply of the display device 10 is ON.

The power control method S10 of the display device 10 may include a 'providing the cable 161 with the power having cable supplying voltage Vs'. In this step S300, the controller of the display device 10 may control the power supply 107 such that power having the cable supplying voltage Vs is provided to the cable 161.

The power control method S10 of the display device may include 'determining whether the reason for termination of operation has occurred'. In this step S400, If the reason for termination of the operation of the display device 10 occurs, the controller may terminate the operation of the display device 10. If the controller does not sense the reason for termination of the operation of the display device 10, the power supply unit 107 may provide power to the cable 161.

Referring to FIG. 15, a flowchart of the step S200 of setting the cable supplying voltage Vs can be observed.

The step S200 of setting the cable supplying voltage Vs may include 'acquiring branch voltage Vd'. In this step S210, the controller can obtain (or measure) the branch voltage Vd at the terminal 108T3 of the voltage control board 108. The measurement of the branch voltage Vd may be as described in FIG. 11. The branch voltage Vd may vary depending on the length of the cable 161.

The step S200 of setting the cable supplying voltage Vs may include 'selecting the cable supplying voltage Vs corresponding to the branch voltage Vd'. In this step S220, the controller may control the cable supplying voltage Vs to be in accordance with the branch voltage Vd.

The cable supplying voltage Vs may be correspondent to the value of the branch voltage Vd or trend of the branch voltage Vd along time, based on the properties of the passive element 279 in the cable 161.

Referring to FIG. 16, a flowchart for the step S220 of selecting the cable supplying voltage Vs corresponding to the branch voltage Vd can be observed. This step S220 can be explained using an example that the passive element 279 is an electrical resistor.

The step S220 of selecting the cable supplying voltage Vs may include a step S221 of determining whether the obtained branch voltage Vd is greater than the first reference voltage Vr1. In this step S221, the controller can compare the branch voltage Vd with the first reference voltage Vr1. The cable 161 can be compared with the first reference length. The first reference length may correspond to the first reference voltage Vr1.

The step S220 of selecting the cable supplying voltage Vs may include a step S222 of setting the cable supplying voltage as the first supply voltage Vs1. If the branch voltage Vd is greater than the first reference voltage Vr1, the cable supplying voltage Vs may be the first supply voltage Vs1. If the length of the cable 161 is shorter than the first reference length, the cable supplying voltage Vs may be the first supply voltage Vs1.

The step S220 of selecting the cable supplying voltage Vs may include a step S223 of determining whether the obtained branch voltage Vd is greater than the second reference voltage Vr2. In this step S223, the controller can compare the branch voltage Vd with the second reference voltage Vr2. The cable 161 can be compared with the second reference length. The second reference length may correspond to the second reference voltage Vr2. The second reference length may be greater than the first reference length.

The step S220 of selecting the cable supplying voltage Vs may include a step S224 of setting the cable supplying voltage as the second supply voltage Vs2. If the branch voltage Vd is greater than the second reference voltage Vr2 and not greater than the first reference voltage Vr1, the cable supplying voltage Vs may be the second supply voltage Vs2. If the length of the cable 161 is between the first reference length and the second reference length, the cable supplying voltage Vs may be the second supply voltage Vs2. The longer the cable 161, the greater the cable supplying voltage Vs may be.

The step S220 of selecting the cable supplying voltage Vs may include a step S225 of determining whether the obtained branch voltage Vd is greater than the third reference voltage Vr3. In this step S225, the controller can compare the branch voltage Vd with the third reference voltage Vr3. The cable 161 can be compared with the third reference length. The third reference length may correspond to the third reference voltage Vr3. The third reference length may be greater than the second reference length.

The step S220 of selecting the cable supplying voltage Vs may include a step S226 of setting the cable supplying voltage as the third supply voltage Vs3. If the branch voltage Vd is greater than the third reference voltage Vr3 and not greater than the second reference voltage Vr2, the cable supplying voltage Vs may be the third supply voltage Vs3. If the length of the cable 161 is between the second reference length and the third reference length, the cable supplying voltage Vs may be the third supply voltage Vs3.

The step S220 of selecting the cable supplying voltage Vs may include a step S227 of setting the cable supplying voltage as the fourth supply voltage Vs4. If the branch voltage Vd is not greater than the third reference voltage Vr3, the cable supplying voltage Vs may be the fourth supply voltage Vs4. If the length of the cable 161 is not smaller than the third reference length, the cable supplying voltage Vs may be the fourth supply voltage Vs4.

FIG. 17 is a graph showing power control characteristics of a display device 10 according to an embodiment of the present invention. FIG. 17 (c) may correspond to the flowchart of FIG. 16. FIG. 17 can be explained together with FIGS. 10 to 16.

Referring to FIG. 17 (a), the cable supplying voltage Vs provided to the cable 161 may vary according to the length of the cable 161 in the display device 10. The longer the cable 161 is, the larger the amount of power consumed in the cable 161 may be. If the amount of power consumed in the cable 161 increases, the voltage of the power supplied to the display unit 20 may be lowered. If the voltage of the power supplied to the display unit 20 is lowered, the brightness of the image provided from the display unit 20 can be lowered. If the cable 161 becomes longer, it may be necessary to raise the cable supplying voltage Vs supplied to the cable 161, taking into consideration the power to be consumed by the cable 161. The cable supplying voltage Vs may correspond to the physical quantity (for example, electric resistance) of the passive element included in the cable 161.

For example, if the length of the cable 161 is not greater than the first reference length Lr1, the cable supplying voltage Vs may be the first supply voltage Vs1. If the length of the cable 161 is between the first reference length Lr1 and the second reference length Lr2, the cable supplying voltage Vs may be the second supply voltage Vs2. If the length of the cable 161 is between the second reference length Lr2 and the third reference length Lr3, the cable supplying voltage Vs may be the third supply voltage Vs3. If the length of the cable 161 is not smaller than the third reference length Lr3, the cable supplying voltage Vs may be the fourth supply voltage Vs4.

The controller of the display device 10 according to an embodiment of the present invention can determine the length of the cable 161 using the branch voltage Vd. Therefore, the relation between the branch voltage Vd and the cable 161 may be required.

Referring to FIG. 17 (b), the relation between the branch voltage Vd and the length of the cable 161 is shown in a graph. The branch voltage Vd may have a negative correlation with the length of the cable 161.

For example, if the length of the cable 161 is the first reference length Lr1, the branch voltage Vd may be the first reference voltage Vr1. For example, if the length of the cable 161 is the second reference length Lr1, the branch voltage Vd may be the second reference voltage Vr2. For example, if the length of the cable 161 is the third reference length Lr3, the branch voltage Vd may be the third reference voltage Vr3.

In order to set the cable supplying voltage Vs corresponding to the length of the cable 161 shown in FIG. 17 (a), it may be necessary to set the correlation between the measured branch voltage Vd and the cable supplying voltage Vs.

Referring to FIG. 17 (c), the relationship between the branch voltage Vd and the supply voltage Vs may be substantially the same as the flow chart shown in FIG. 16.

The foregoing embodiments are merely examples and are not to be considered as limiting the present disclosure. The present teachings can be readily applied to other types of methods and apparatuses. The features, structures, methods, and other characteristics of the embodiments described herein may be combined in various ways to obtain additional and/or alternative embodiments.

Certain embodiments or other embodiments of the invention described above are not mutually exclusive or distinct from each other. Any or all elements of the embodiments of the invention described above may be combined or combined with each other in configuration or function.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A display device comprising:
a display unit comprising a display panel;
a control unit positioned outside of the display unit and comprising a power supply; and
a cable outside of the display unit connecting the display unit and the control unit,
wherein
a length of the cable is adjustable by selectively adding or removing at least one extension cable, wherein
the control unit comprises a voltage control board having a first terminal and a second terminal connected to the power supply, and a third terminal connected to the cable, wherein
a control signal is output from the first terminal and the second terminal to control a property of an electric power in accordance with a length of the cable, wherein
the length of the cable is measured using the third terminal, wherein
the control unit is configured to set a cable supplying voltage in accordance with a branch voltage acquired from the third terminal, wherein
the branch voltage varies based on the length of the cable, wherein
the cable supplying voltage corresponds to a value of the branch voltage or a trend of the branch voltage with respect to time, wherein
the control unit is further configured to set the cable supplying voltage Vs to a first supply voltage corresponding to a first reference voltage based on the acquired branch voltage varying among all values of voltage within a range greater than the first reference voltage and less than a second reference voltage, wherein
the second reference voltage is greater than the second first reference voltage.

2. The display device of claim 1, wherein the property of the electric power includes an electric voltage of the electric power.

3. The display device of claim 2, wherein the electric voltage of the electric power is greater as the length of the cable is longer.

4. The display device of claim 1, wherein the extension cable has a predetermined length.

5. The display device of claim 1, wherein the cable includes a passive element having an impedance, and wherein the property of the electric power is controlled by the control unit in accordance with the impedance of the passive element.

6. The display device of claim 5, wherein the passive element includes a passive element wire disposed along the cable.

7. The display device of claim 5, wherein the passive element includes a passive element lump disposed on a portion of the cable.

8. The display device of claim 5, wherein the passive element includes an electric resistor, and wherein the property of the electric power is controlled by the control unit in accordance with an electric resistance of the electric resistor.

9. The display device of claim 5, wherein the cable includes:
an electric power line carrying the electric power; and
a signal line carrying the signal.

10. The display device of claim 9, wherein the electric power line and the signal line are layered in the cable.

11. The display device of claim 1, further comprising a test voltage source and a first electric resistor, and wherein the test voltage source, the first electric resistor, the voltage control board, and the cable form an electric circuit.

12. The display device of claim 1, wherein the control unit is further configured to set the cable supplying voltage Vs to a second supply voltage corresponding to the second reference voltage based on the acquired branch voltage being any voltage within a range greater than the second reference voltage and less than a third reference voltage, and
wherein the third reference voltage is greater than the second reference voltage.

* * * * *